United States Patent [19]

Jones

[11] Patent Number: 4,932,274
[45] Date of Patent: * Jun. 12, 1990

[54] CHARACTERIZING LINKAGE ASSEMBLY

[75] Inventor: James L. Jones, Winfield, Kans.

[73] Assignee: Gordon-Piatt Energy Group, Inc., Winfield, Kans.

[*] Notice: The portion of the term of this patent subsequent to Nov. 22, 2005 has been disclaimed.

[21] Appl. No.: 273,193

[22] Filed: Nov. 18, 1988

Related U.S. Application Data

[63] Continuation-in-part of Ser. No. 27,841, Mar. 19, 1987, Pat. No. 4,785,680.

[51] Int. Cl.$^5$ .................. F16H 21/44; F16H 53/04; F16C 19/00
[52] U.S. Cl. .................................. 74/96; 74/107; 74/568 FS; 384/58
[58] Field of Search .............. 74/96, 107, 568 FS; 384/55, 58

[56] References Cited

U.S. PATENT DOCUMENTS

| | | | |
|---|---|---|---|
| 982,870 | 1/1911 | Range | 384/55 |
| 1,525,052 | 2/1925 | Spotz | 74/568 R |
| 2,286,173 | 6/1942 | Maxon | 277/3 |
| 2,315,171 | 3/1943 | Voorheis | 251/132 |
| 2,323,737 | 7/1943 | Tritle | 74/568 |
| 2,638,387 | 5/1953 | Bech | 384/58 X |
| 3,042,325 | 7/1962 | Hughes et al. | 242/26.3 |
| 3,138,037 | 6/1964 | Schumann | 74/516 |
| 3,352,167 | 11/1967 | Winters | 74/96 |
| 3,425,286 | 2/1969 | Ellis | 74/63 |
| 3,659,909 | 5/1972 | Egbert | 384/55 X |
| 3,685,364 | 8/1972 | Turecek et al. | 74/55 |
| 3,706,438 | 12/1972 | Condon et al. | 251/251 |
| 4,635,898 | 1/1987 | Rollins et al. | 251/229 |
| 4,785,680 | 11/1988 | Jones | 74/107 X |
| 4,812,088 | 3/1989 | Hake | 384/58 X |

Primary Examiner—Allan D. Herrmann
Attorney, Agent, or Firm—Bill D. McCarthy

[57] ABSTRACT

An improved characterizing linkage assembly of the type utilized to proportion the flow of fluids in response to motor controls, such as in the control of fuel and air mixtures in industrial combustion systems. The linkage system comprises a cam assembly having an adjustable curvilinear cam band, which is rotatable by a drive shaft. A biased follower rod, bearingly supported for reciprocal movement, is urged against the cam band. Movement of the follower rod pivots a linkage actuator arm which is bearingly supported on the drive shaft. Rotation of the drive shaft in response to a change in a selected process parameter imparts movement to the cam band, the follower rod and thus the linkage actuator arm being the proportional travel.

10 Claims, 5 Drawing Sheets

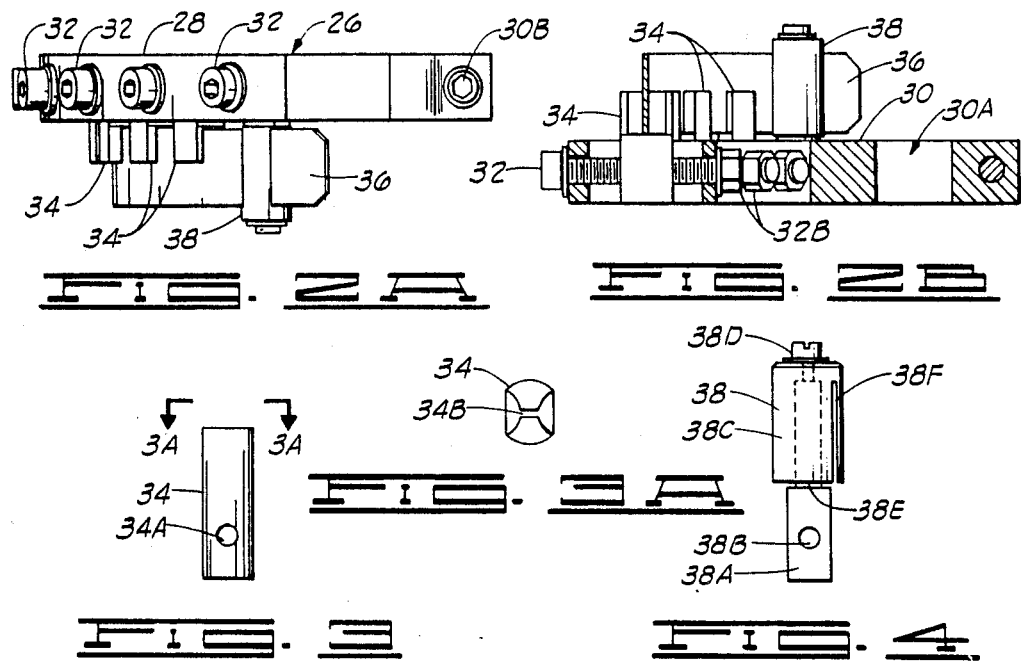
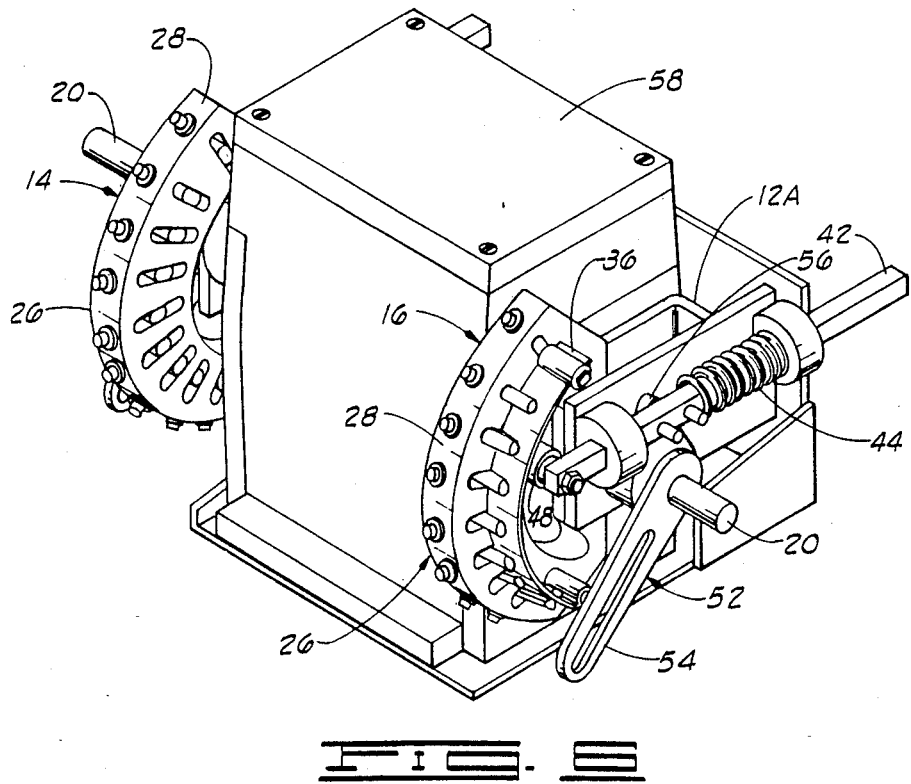

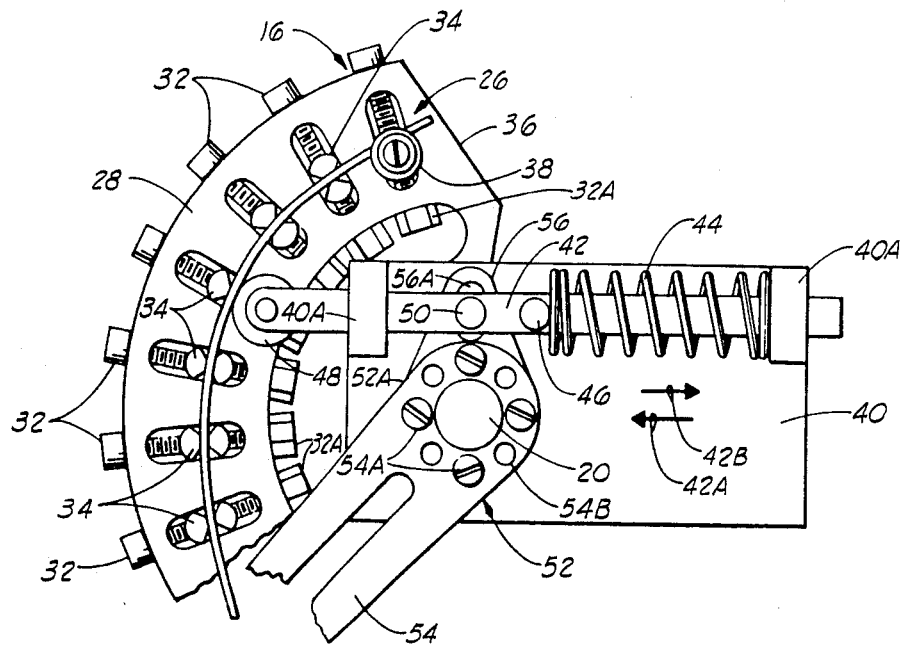

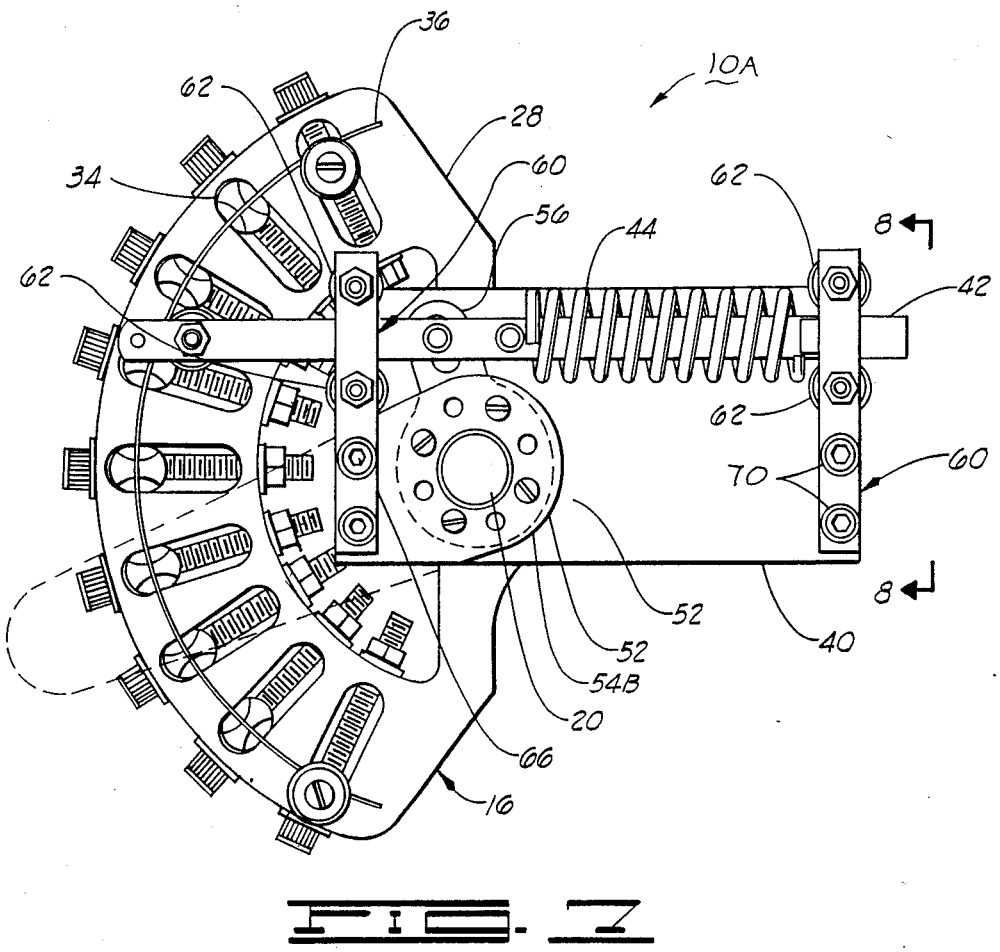
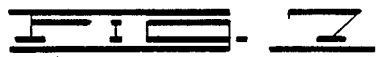
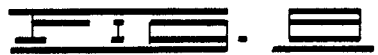

CHARACTERIZING LINKAGE ASSEMBLY

CROSS REFERENCED TO RELATED APPLICATIONS

This is a continuation-in-part application to Ser. No. 027,841, filed Mar. 19, 1987, now U.S. Pat. No. 4,785,680 which is incorporated herein by reference.

BACKGROUND OF THE INVENTION

1. Field of Invention.

The present invention relates to the field of fluid flow systems, and more particularly but not by way of limitation, to an improved characterizing linkage assembly for proportioning the flow of fluids in response to motor controls.

2. Discussion.

In the control of fuel and air mixtures to industrial furnaces, boilers and the like, there is a need to maintain proper proportions of the fuel and air over widely varying firing conditions. A number of prior art devices are known for varying inlet fuel valving and inlet air venting in response to monitored signals, such as temperature and stoichiometric parameters. For example, monitors are used to determine the free oxygen content of a stack gas and to trim the inlet air as the monitored reading varies from a set point.

As pointed out in numerous prior art publications, and as is known by persons of ordinary skill in this field, each industrial burner application will have numerous variables which take each such installation beyond the range of prediction, and thus requiring that each such installation be provided with the capability of tailoring its characterizing controls to its peculiarities over the range of its firing usage. Several prior art characterizing, or proportioning controls are as follows.

The patent issued to Maxon, U.S. Pat. No. 2,286,173, teaches a valve to proportion air and fuel to industrial burner systems in which an air gate is journaled in an air passage bore and is rotatable by a segmental arm structure. A spring loaded stemmed valve (biased closed) is supported in a fuel inlet bore. A push rod is supported to engage the stemmed valve and is operable to open same as it is pressed against the stemmed valve. Actuating means is disposed to actuate the push rod by the arm structure which supports a series of individually adjustable threaded pins carried by the arm structure to variably depress the push rod along the arc of the arm structure to vary the airfuel ratio. A flexible strip is disposed between the push rod and the threaded pins to facilitate engagement therewith.

The patent issued to Voorheis, U.S. Pat. No. 2,315,171, teaches an adjustable valve in which a series of adjusting screws provide a path to selectively depress a roller supported by an operating handle connected to a valve rod which is spring biased. Thus the object of the invention, to move the valve control element through a predetermined sequence of valve settings, is achieved.

The patent issued to Condon et al., U.S. Pat. No. 3,706,438, teaches an operating mechanism for controlling movement of a valve element. A continuous deformable channel has a pair of opposed cam surfaces supported by adjusting screws and a support member. A follower is connected to a shaft which moves a valve element between open and closed positions.

The patent issued to Spotz, U.S. Pat. No. 1,525,052, teaches an adjustable cam surface and a cam follower. The shape of the cam surface is determined by a plurality of adjustable struts which connect it to a carrying frame.

The patent issued to Tritle, U.S. Pat. No. 2,323,737 teaches a control system having a cam that is mounted for pivoting on a pin and which sections may be adjusted by means of screws.

Other patents of interest are: U.S. Pat. No. 3,425,286 issued to Ellis; U.S. Pat. No. 4,635,898 issued to Rollins et al.; U.S. Pat. No. 3,706,438 issued to Condon et al.; U.S. Pat. No. 3,685,364 issued to Turecek, et al.; U.S. Pat. No. 3,352,167 issued to Winters; U.S. Pat. No. 3,138,037 issued to Schumann; and U.S. Pat. No. 3,042,325 issued to Hughes, et al.

None of these prior art control devices provide the advantages and the novel structure of the present invention as described herein.

SUMMARY OF THE INVENTION

The present invention provides an improved characterizing linkage assembly which is used in a combustion system or the like in which a modulator motor, in response to a process parameter, actuates the linkage assembly for the purpose of itself motoring other selected elements, such as, for example, a fuel flow valve and combustion air inlet vanes.

The present linkage assembly comprises a drive shaft which is rotatably supported by a support frame, the drive shaft being rotatable by the modulator motor. A linkage actuator arm is bearingly supported on the drive shaft and has a follower arm portion extensive from a central hub portion of the linkage actuator arm. A follower rod is slidingly supported by the support frame for reciprocal movement and is in pivotal engagement with the follower arm portion of the linkage actuator arm so that movement of the follower rod rotates the linkage actuator arm on the drive shaft.

The follower rod is spring biased toward engagement with a cam assembly which, upon rotation, serves to push the follower rod against its biasing spring. The cam assembly is attached to the drive shaft and rotates in response to its rotation so that rotation of the drive shaft results in movement of the follower rod which, in turn, imparts rotation to the linkage actuator arm.

One embodiment of the present invention comprises an improved follower rod bearing assembly in which the reciprocal motion of the follower rod is facilitated by appropriately disposed roller bearings.

The cam assembly has an adjustable cam band for forming an adjustable curvilinear stop band rotatable with the drive shaft and which the spring biased follower rod is urged to follow in its proportional travel.

An object of the present invention is to provide an improved characterizing linkage assembly which is of relatively simple construction and which is readily adjustable to achieve proportional control of various process parameters.

Another object of the present invention, while achieving the above stated object, is to provide an improved characterizing linkage assembly which is relatively inexpensive to manufacture, having a minimum of components and requiring conventional operations to manufacture, and which requires minimal maintenance while achieving acceptable performance in such hostile environments that many industrial combustion systems present.

A further object of the present invention, while achieving the above stated objects, is to provide an improved characterizing linkage assembly which offers efficiency of operation, cost and reliability of performance in hostile environments.

Other objects, features and advantages of the present invention will be apparent from the following detailed description when read in conjunction with the drawings and appended claims.

BRIEF DESCRIPTION OF DRAWINGS

FIG. 2A is a top plan view thereof and FIG. 2B is a view taken at 2B—2B in FIG. 2.

FIG. 3 is a top plan view of one of the band gripping members of the cam assembly portion shown in FIG. 2; and FIG. 3A is a view taken at 3A—3A in FIG. 3.

FIG. 4 is a view of one of the two band gripping members utilized to grippingly retain the opposing end portions of flexible band member shown in FIG. 2.

FIG. 5 a partial, side elevational view of the characterizing linkage assembly shown in FIG. 1; FIG. 5A is a partially detailed top plan view of a portion of the characterizing linkage assembly shown in FIG. 5; and FIG. 5B is a partially cutaway front view of a portion of the characterizing linkage assembly depicted in FIG. 5.

FIG. 6 illustrates another installation in which the characterizing linkage assembly of the present invention is utilized.

FIG. 7 is a side elevational view of another characterizing linkage assembly constructed in accordance with the present invention.

FIG. 8 is a rear elevational view of the characterizing linkage assembly shown in FIG. 7.

DESCRIPTION

Figure 1:
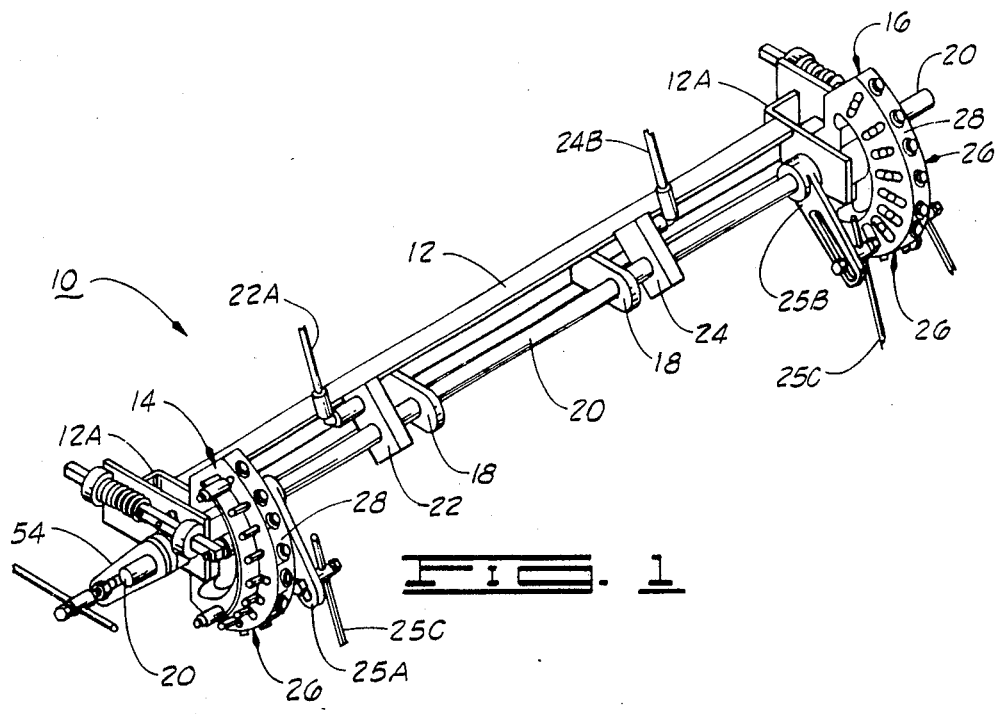
FIG. 1 is an isometric view of a characterizing linkage assembly constructed in accordance with the present invention and depicted in a typical installation.

In the following description, like numerals will be used to designate the same components of the various drawing figures. Referring to the drawings in general, and more particularly to FIG. 1, shown therein are as follows.

10 is a typical installation of the characterizing linkage assembly of the present invention.

12 is a support frame which typically will be attached to a conventional burner assembly.

14 is a characterizing linkage assembly constructed in accordance with the present invention. The characterizing linkage assembly 14 is supported on one end of the support frame 12; and 16 is another characterizing linkage assembly supported on the other end of the support frame 12. While the installation 10 illustrates a pair of the characterizing linkage assemblies, it will be appreciated that the present invention is not so limited, as the characterizing linkage assemblies can be used singly or in any combination.

18 is a pair of support arms extensive from the support frame 12.

20 is a rotatable drive shaft bearingly supported in aligned apertures in the support arms 18.

22 and 24 are crank arms affixed to the drive shaft 20 and are connectable via connector linkages 22A and 24B to primary/secondary air control sleeves or other burner adjustments.

25A and 25B are crank arms affixed to the drive shaft 20 and connectable via connector linkages 25C to a conventional modulator motor, an example of which would be a control assembly which senses process parameters, such as stack free oxygen among many other parameters, and pushes or pulls the connector linkages 25C in a predetermined manner in response to process changes to rotate the drive shaft 20.

The characterizing linkage assemblies 14 and 16, supported at opposing ends of the support frame 12, will now be described with reference to FIGS. 2 through 5B. Since the construction of these characterizing linkage assemblies 14 and 16 is essentially identical with the minor exception of the left/right locations of outboard components thereof, it will be sufficient herein to describe one of these assemblies, with the characterizing linkage assembly 16 being arbitrarily selected. The characterizing linkage assembly 16 is shown in partial detail in the mentioned figures and comprises as follows.

26 is a cam assembly attached to near one end of the support frame 12 and comprises:

28 is a cam support member having a plurality of radially extending spaced apart radial slots 28A, and an access opening 28B.

30 is a hub portion having a slotted bore 30A and tightening bolt 30B disposed in appropriately placed apertures, the lower most one of which is threaded so that the diameter of the bore 30A can be reduced once it is slipped over the drive shaft 20 to secure the hub portion 30 thereto; and 32 depicts a plurality of headed band support bolts, one for each of the radial slots 28A, and extending through apertures along the longitudinal axis of each radial slot so that each band support bolt 32 is axially disposed along one of the radial slots 28A as shown. Each band support bolt 32 is provided with a nut and spring washer 32A. Each nut 32A is locked to its band support bolt 32 with a thread locking compound. The nut 32A rotates with the band support bolt 32 sliding on the spring washer to retain the band support bolt 32 in the cam assembly 26.

34 depicts a plurality of band gripping members, each of which is supported by one of the band support bolts 32 and is disposed in a respective radial slot 28A. Each of the band gripping members 34 has a body portion with a threaded aperture 34A near one end and a band engaging portion with a slot 34B at the other end. See FIGS. 3 and 3A. Each of the band gripping members 34 is supported by one of the band support bolts 32 via its threaded aperture 34A and is positionable in its respective radial slot 28A. The band gripping members 34 can be moved along their supporting band support bolts 32 to their desired positions by rotating the band support bolts 32.

36 is a flexible band member which is supported by the band engaging portions of the band gripping members 34. The thickness of the band member 36 is selected to be grippingly engaged by the slots 34B of the band gripping members 34 as shown. The width of the band member 36 is selected so as to extend outboard of the retaining slots 34B so that the band member 36 forms an adjustable curvilinear stop band for the purpose described hereinbelow. The shape of the band member 36 is adjusted by selectively positioning the band gripping members 34 along the supporting band support bolts 32 to flex and retain the band member 36 in a desired curvilinear configuration.

The opposing ends of the band member 36 are secured by a pair of modified band gripping members, one of which is depicted in FIG. 4 and comprises as follows.

Figure 2:
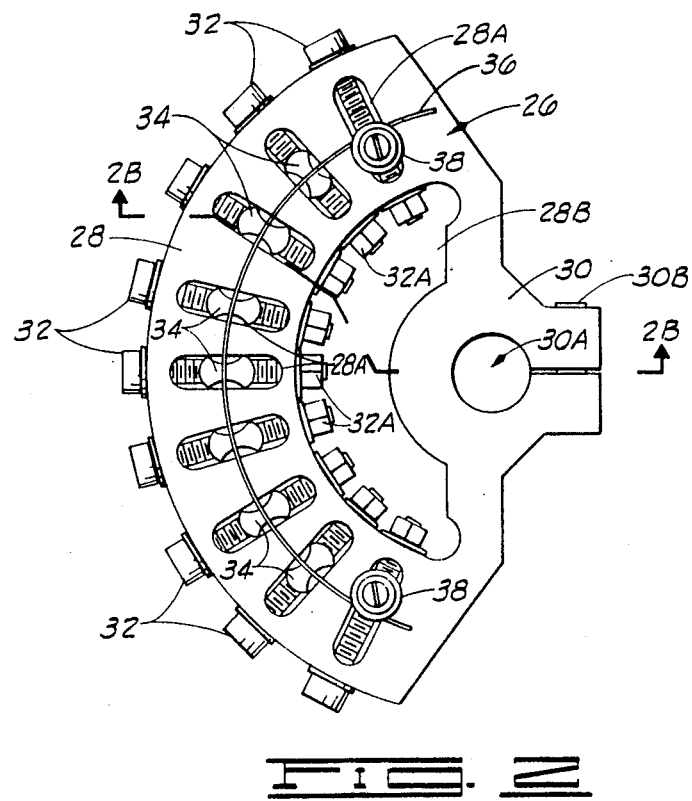
FIG. 2 is a side elevational view of a portion of the cam assembly of the characterizing linkage assembly shown in FIG. 1.

38 in FIG. 4 depicts one of the band gripping members, such having a body portion 38A similar to the body portion of the above described band gripping members 34, which has a threaded aperture 38B supported on a band support bolt 32 in an end one of the radial slots 28A as shown in FIG. 2. The band gripping member 38 also has a hollow band gripping portion 38C, and a screw member 38D extensive into the hollow body portion thereof. The screw member 38D engages a threaded aperture in the end of a post portion 38E which extends into the hollow of the band gripping portion 38C. This arrangement permits the band gripping portion 38C to be rotatable on the post portion 38E with a change of angle of the flexible band member 36 while securing the band member 36 relative to the face of the cam support member 28. A slot 38F is provided through one end of the band gripping portion 38C through which one end of the band member 36 is extended. Tightening of the screw member 38D assures that the end of the band member 36 is maintained within the slot 38F while allowing the band ends to slip through the slot when the length of the band changes due to increase or decrease of the arc length.

The cam support member 28 is mounted on the drive shaft 20 and secured thereto via the bolt 30B. As the drive shaft 20 is caused to be rotated, it will be appreciated that the cam support member 28, and thus the band member 36, is caused to be rotated thereby. Since the slots 28A are radially disposed relative to the bore 30A, if the distance between the band member 36 and the center of the bore 30A is equal at each of the band gripping members 34 which grippingly retain the band member 36, the curvilinear band member 36 will circumscribe a portion of a cylindrical surface in its travel imparted by the drive shaft 20. However, with individual adjustments made to the various band gripping members 34, the flexible band member 36 can be made to have a selected curvilinear circumscription in its travel, an attribute utilized by the characterizing linkage assembly 16 for the purpose described hereinbelow.

FIGS. 5, 5A, and 5B show the details of the characterizing linkage assembly 16 as follows.

40 is another portion of the support frame 12 and comprises a support plate attached to one end thereof. A supporting end plate 12A, having an appropriately disposed drive shaft clearance bore, can be provided as shown. A clearance aperture is provided in the support plate 40 for extension of the drive shaft 20 therethrough. The support plate 40 has a pair of spaced apart tab members 40A which have a pair of axially aligned rod support apertures.

42 is a follower rod member which is slidingly supported by the rod support apertures in the support plate 40. That is, the follower rod member 42 is slidable in opposing first and second directions as depicted by the arrows 42A and 42B.

44 is a coil spring member which is disposed about the follower rod member 42.

46 is a spring retainer member which is extensive through an aperture in the follower rod member 42, and the spring member 44 is retained between the spring retainer member 46 and one of the tab members 40A extensive from the support plate 40.

48 is a roller which is supported at the distal end of the follower rod member 42 via a screw arbor 48A and threaded aperture in a threaded portion thereof. The spring member 44 biases the follower rod member 42 in the first direction 42A and the roller 48 is restrained to be in rolling engagement with the surface of the band member 36 so that the follower rod member 42 is caused to reciprocate in the first and second directions 42A, 42B when the curvilinearity of the band member 36 is appropriately adjusted by the band gripping members 34 supported on the band support bolts 32 of the cam assembly 26.

50 is another pin member which extends through, and is retained in, an aperture in the follower rod member 42.

52 is a linkage actuator arm having a central hub portion 52A with a bore 52B. As mentioned above, the drive shaft 20 extends through an aperture in the support plate 40, and the bore 52B is sized so as to loosely receive the drive shaft 20 therethrough so that the linkage actuator arm 52 is supported by the drive shaft 20 while being independent to the rotational movement thereof.

54 is a linkage arm portion of the linkage actuator arm 52, and while the linkage actuator arm 52 can be of one piece construction, it is convenient to attach the linkage arm 54 to the central hub portion 52A via screws 54A which extend through selected holes of a circle of screw holes 54B. With the central hub portion 52A provided with a circle of threaded screw holes, the angular disposition of the linkage arm 54 can be altered as desired by the mating of these screw holes in a desired configuration and securing the linkage arm 54 to the central hub portion 52A via the screws 54A.

56 is a follower arm portion of the linkage actuator arm 52 which extends from the central hub portion 52A. The follower arm 56 has a generally longitudinal slot 56A which extends radially relative to the center of the bore 52B and is disposed to loosely receive a portion of the pin member 50 which extends from the follower rod member 42.

In order to retain the linkage actuator arm 52 on the drive shaft 20, the follower arm 56 is positioned between the follower rod member 42 and the support plate 40 with sufficient clearance to avoid interference between these components. As the follower rod member 42 is caused to be moved in the first or second directions 42A, 42B, the pin member 50 causes the follower arm 56 to be moved to the left or right, which then causes the linkage arm 54 to rotate on the drive shaft 20.

Returning to FIG. 1, it will first be noted that the description of the characterizing linkage assembly 16 will also be applicable to the characterizing linkage assembly 14, both of which are disposed at opposing ends of the drive shaft 20. Therefore, the same numbers used above will depict like components of the characterizing linkage assembly 14 in FIG. 1. For convenience of claiming, the term characterizing linkage assembly will sometimes be used hereinbelow to refer to the assemblies 14 and 16 in combination as shown in FIG. 1 and FIG. 6.

Turning to FIG. 6, and again using the same numerals as above for like components, shown therein are the characterizing linkage assemblies 14 and 16 connected to opposing ends of the drive shaft 20. However, in the application depicted in FIG. 6, shown therein is:

58 is a motor control unit which supports the drive shaft 20 and which imparts responsive rotary movement to the drive shaft 20. The motor control unit 58 shown may be, by way of example, a Modutrol motor control manufactured by Honeywell Corporation of Minneapolis, Minn. Modutrol is a trademark of that company and is the name of a product which contains at least one electronic transducer and a modulator motor for imparting rotational energy to the drive shaft 20 in response to analyzed data received from the controlled process. For example, in an industrial combustion application, if the air and fuel mixture is not proper, or changes from an optimum setting, or a change in boiler load is called for, the drive shaft 20 is caused to be rotated, which in turn causes the linkage arm 54 of the linkage actuator arm 52 to be rotated. The linkage arms 54, 56 of the characterizing linkage assemblies 14, 16 may be connected to the louvers of an intake air conduit or to a fuel valve. Normally, the assemblies 14 and 16 are connected to fuel valves, with one being a gas fuel valve and the other being an oil fuel valve, and the air intake is driven by another linkage. Since the shape of the flexible band member of each of the characterizing linkage assemblies 14 and 16 can be independently configured to a desired curvilinear arc, the characterizing linkage assemblies 14 and 16, while acted on simultaneously by the same drive shaft 20, can be caused to respond in the movement of their respective linkage arms 54 independently to each other.

The operation of the characterizing linkage assemblies 14 and 16 will have become clear from the above description. It will be pointed out that the characterizing linkage assembly of the present invention offers a number of advantages over the prior art in that a high degree of response movement of the linkage arm 54 is achieved while minimizing the number of components and weight thereof, resulting in a low inertia assembly which can be made with relatively quick rotational reversals. Also, the components are of relatively simple and open design, thereby affording constant access for visual inspection and repair.

Figure 9:
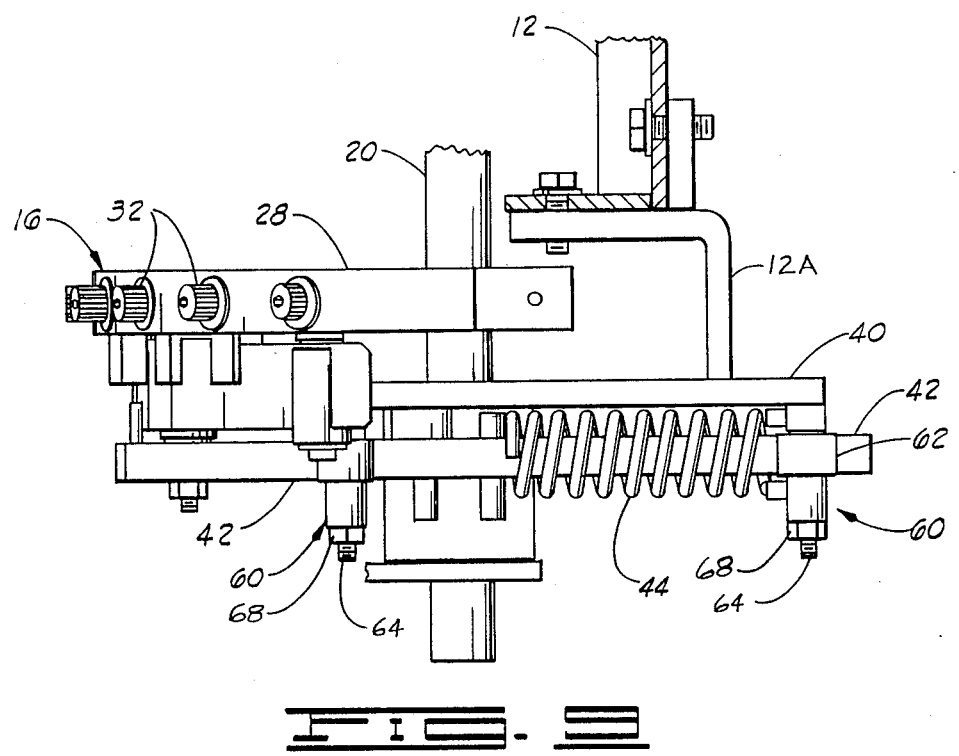
FIG. 9 is a top plan view of the characterizing linkage assembly shown in FIG. 7.

Turning now to FIG. 7 through 9, depicted therein is a view of a modified characterizing linkage assembly 10A that is constructed identically to that of characterizing linkage assembly 10 except as follows. In FIG. 7:
60 depicts a pair of follower rod bearing assemblies.
62 indicates appropriately disposed roller bearing.
64 depicts roller bearing mounting bolts.
66 depicts clamp bars.
68 indicates nut and spring washer members.
70 indicates mounting bolts.
72 depicts suitably dimensioned spacer members, one of which is shown in FIG. 8.

Each of the follower rod bearing assemblies 60 has two of the roller bearings 62 which are fastened to one of the clamp bars 66 with the roller bearing mounting bolts 64, and secured thereto by the nut and spring washers 68. Each following rod bearing assembly 60 is fastened to the support plate 40 by the mounting bolts 70. The spacer member 72 is disposed as shown in FIG. 8 to assure correct alignment of the roller bearings 62.

The pair of follower rod bearing assemblies 60 supports the follower rod member 42 in the manner described hereinabove for the characterizing linkage assembly 10, except the roller bearings 62 provide an improved sliding ease of the follower rod member 42. Also, this provides some efficiency in manufacturing alignment of the linear sliding support necessary for the follower rod member 42. Thus, laborious and expensive machining is avoided for the machining required to axially align the support structures.

It is clear that the present invention is well adapted to carry out the objects and to attain the ends and advantages as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is

1. A characterizing linkage assembly activated by a modulator motor and responsive thereto for proportionately motoring selected elements, the characterizing linkage assembly comprising:
    a support frame;
    a drive shaft bearingly supported by the support frame, the drive shaft rotatable by the modulator motor;
    a linkage actuator arm rotatably supported by the drive shaft by a central hub portion thereof and having a follower arm portion extensive from the central hub portion of the linkage actuator arm;
    follower rod means supported by the support frame for rotating the linkage actuator arm, the follower rod means comprising: a follower rod; and follower rod bearing means for supporting the follower rod for reciprocal movement in a first direction and in an opposite second direction, the follower rod disposed to pivotally engage the follower arm portion of the linkage actuator arm;
    biasing means for biasing the follower rod means in the first direction; and
    cam means attached to, and rotatable by, the drive shaft and cooperating with the biasing means for moving the follower rod means in response to rotation of the drive shaft, the cam means characterized as comprising: a cam support member having a hub portion having a bore and attachable to the drive shaft extensible through the hub portion bore;
    cam band means supported by the cam support member for forming an adjustable curvilinear stop band rotatable with the drive shaft; and
    wherein the follower rod means is biased by the biasing means so that one end of the follower rod means is slidably restrained along the stop band whereby the rotational position of the follower arm portion and the linkage actuator arm is determined by the rotational position of the drive shaft and the selected adjustment of the curvilinear stop band.

2. The characterizing linkage assembly of claim 1 wherein the support frame has a support plate portion, and the follower rod bearing means comprises at least one follower rod bearing assembly characterized as comprising:
    a clamp bar;
    a pair of roller bearings;
    means for attaching the roller bearings to the clamp bar in spaced apart relationship to slidingly engage the follower rod therebetween; and
    means for mounting the clamp bar to the support plate portion so that the roller bearings are disposed in juxtaposition to the support plate portion.

3. The characterizing linkage assembly of claim 2 wherein the cam support member is characterized as having a plurality of radially extending, spaced apart radial slots, the cam support member having a plurality of bores, each of such bores extending along the longitudinal axis of one of the radial slots and communicating with its respective radial slot, and wherein the cam band means comprises:

a plurality of threaded band support bolts each of which is disposed in one of the bores of the support member and disposed to extend the length of the respective radial slot associated therewith;

a plurality of band gripping members each of which has a body portion and a band engaging portion, the body portion having a threaded aperture engageable on one of the threaded band support bolts and supported within the radial slot associated therewith, the band engaging portion of each band gripping member extensive from such radial slot along one side of the cam support member and having a band gripping slot disposed therethrough; and a flexible band member grippingly supported in the band gripping slots of the band gripping members, the curvilinear shape of the flexible band member determined by the disposition of the band gripping members on the band support bolts in the radial slots.

4. The characterizing linkage assembly of claim 3 wherein the cam support member supported by the drive shaft is rotatable by force applied to the drive shaft.

5. The characterizing linkage assembly of claim 3 further comprising:

drive shaft modulator means for selectively rotating the drive shaft in response to a selected measured process parameter.

6. The characterizing linkage assembly of claim 5 further comprising:

a second linkage actuator arm rotatably supported by the drive shaft by a central hub portion thereof and having a follower arm portion extensive from the central hub portion of the linkage actuator arm;

second follower rod means slidingly supported by the support frame for rotating the second actuator arm the second follower rod means comprising:

a second follower rod; and second follower rod bearing means for supporting the second follower rod for reciprocal movement in the first and opposite directions, the second follower rod disposed to pivotally engage the follower arm portion of the second linkage actuator arm;

second biasing means for biasing the second follower rod in the first direction; and second cam means supported by the drive shaft and cooperating with the second biasing means for moving the second follower rod in the first and second directions in response to rotation of the drive shaft.

7. The characterizing linkage assembly of claim 6 wherein the support frame has a second support plate portion, and the second follower rod bearing means comprises at least one follower rod bearing assembly characterized as comprising:

a clamp bar;

a pair of roller bearings;

means for attaching the roller bearings to the clamp bar in spaced apart relationship to slidingly engage the second follower rod therebetween; and means for mounting the clamp bar to the second support plate portion so that the roller bearings are disposed in juxtaposition to the second support plate portion.

8. The characterizing linkage assembly of claim 7 wherein the second cam means comprises:

a second cam support member having a hub portion having a bore and attachable to the drive shaft extensible through the hub portion bore; and second cam band means supported by the second cam support member for forming a second adjustable curvilinear stop band rotatable with the drive shaft; and wherein the second follower rod is biased by the second biasing means so that one end of the second follower rod is slidably restrained along the second stop band whereby the rotational position of the second follower arm portion of the second actuator arm is determined by the rotational position of the drive shaft and the selected adjustment of the second curvilinear stop band.

9. The characterizing linkage assembly of claim 8 wherein the second cam support member is characterized as having a plurality of radially extending spaced apart radial slots, the second cam support member having a plurality of bores, each of such bores extending along the longitudinal axis of one of the radial slots and communicating with its respective radial slot, and wherein the second cam band means comprises:

a plurality of threaded which is disposed in one of the bores of the second support member and disposed to extend the length of the respective radial slot associated therewith;

a plurality of band gripping members each of which has a body portion and a band engaging portion, the body portion having a threaded aperture engageable on one of the threaded band support bolts and supported within the radial slot associated therewith, the band engaging portion of each band gripping member extensive from such radial slot along one side of the cam support member and having a band gripping slot disposed therethrough; and a flexible band member grippingly supported in the band gripping slots of the band gripping members, the curvilinear shape of the flexible band member determined by the disposition of the band gripping members on the band support bolts in the radial slots.

10. The characterizing linkage assembly of claim 9 wherein the cam support member supported by the drive shaft is rotatable by force applied to the drive shaft.

* * * * *